United States Patent
Levy et al.

(10) Patent No.: US 11,651,204 B2
(45) Date of Patent: May 16, 2023

(54) STEERING FOR UNSTRUCTURED MEDIA STATIONS

(71) Applicant: APPLE INC., Cupertino, CA (US)

(72) Inventors: Mark H. Levy, Winchester (GB); Jan Markus Harrie Van Balen, London (GB); Arvind S. Shenoy, San Jose, CA (US); Matthias Mauch, London (GB); Daniel Cartoon, South San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1366 days.

(21) Appl. No.: 15/885,047

(22) Filed: Jan. 31, 2018

(65) Prior Publication Data

US 2019/0079935 A1    Mar. 14, 2019

Related U.S. Application Data

(60) Provisional application No. 62/556,364, filed on Sep. 9, 2017.

(51) Int. Cl.
| | |
|---|---|
| *G06K 9/62* | (2022.01) |
| *G06F 16/438* | (2019.01) |
| *G06N 20/00* | (2019.01) |
| *G06F 16/44* | (2019.01) |
| *G06N 3/08* | (2023.01) |
| *G06N 3/04* | (2023.01) |
| *G06V 20/40* | (2022.01) |

(52) U.S. Cl.
CPC .......... *G06F 16/4387* (2019.01); *G06F 16/44* (2019.01); *G06K 9/6263* (2013.01); *G06K 9/6274* (2013.01); *G06N 3/0454* (2013.01); *G06N 3/08* (2013.01); *G06N 20/00* (2019.01); *G06V 20/41* (2022.01)

(58) Field of Classification Search
CPC ..... G06F 16/4387; G06F 16/44; G06N 20/00; G06N 3/0454; G06K 9/00718; G06K 9/6263; G06K 9/6274
See application file for complete search history.

(56) References Cited

U.S. PATENT DOCUMENTS

| | | | |
|---|---|---|---|
| 7,840,691 B1 | 11/2010 | De Bonet | |
| 8,492,638 B2 | 7/2013 | Faenger | |
| 8,613,022 B2 | 12/2013 | Okajima | |
| 8,971,541 B2 | 3/2015 | Marko | |
| 9,503,500 B2 * | 11/2016 | Bernhardsson | G06F 16/639 |
| 9,531,989 B1 * | 12/2016 | Jehan | H04N 5/915 |
| 2005/0021470 A1 * | 1/2005 | Martin | G11B 27/002 |
| | | | 705/51 |
| 2012/0215878 A1 | 8/2012 | Kidron | |

(Continued)

*Primary Examiner* — Raymond L Nimox
(74) *Attorney, Agent, or Firm* — Blank Rome LLP

(57) ABSTRACT

The present technology pertains to steering a playlisting service toward media items that are likely to receive positive feedback from a user operating a client device. The present technology permits a request to play media items without requiring an input context. A playlist service can begin to receive feedback on the playback of the media items and the received playback can be utilized by a steering service in response to a steering request to identify media items for playback that are likely to receive positive feedback based on the feedback received on a sequence of previously played media items.

20 Claims, 9 Drawing Sheets

(56) References Cited

U.S. PATENT DOCUMENTS

| | | | |
|---|---|---|---|
| 2013/0031177 A1* | 1/2013 | Willis | G06Q 50/01 |
| | | | 709/204 |
| 2014/0074861 A1 | 3/2014 | Bieschke | |
| 2014/0114985 A1* | 4/2014 | Mok | G06F 16/44 |
| | | | 707/748 |
| 2015/0230022 A1 | 8/2015 | Sakai | |
| 2016/0357506 A1 | 12/2016 | Alsina | |

* cited by examiner

| Position | 1 | 2 | 3 | 4 | 5 | ... |
|---|---|---|---|---|---|---|
| Genre | Pop | E. Dance | Pop | Rock | C. Rock | |
| Feedback | Played | Played | Played | Skipped | | |

FIG. 3A

| Position | 1 | 2 | 3 | 4 | 5 | ... |
|---|---|---|---|---|---|---|
| Genre | Pop | E. Dance | E. Dance | Pop | | |
| Feedback | Played | Played | Played | Skipped | | |

FIG. 3B

| Position | 1 | 2 | 3 | 4 | 5 | ... |
|---|---|---|---|---|---|---|
| Genre | E. Dance | Pop | E. Dance | Pop | E. Dance | |
| Feedback | Played | Played | Played | Played | Played | |

FIG. 3C

STEERING FOR UNSTRUCTURED MEDIA
STATIONS

CROSS REFERENCE TO RELATED
APPLICATIONS

This application claims benefit to U.S. provisional application No. 62/556,364, filed on Sep. 9, 2017, which is expressly incorporated by reference herein in its entirety.

TECHNICAL FIELD

The present technology pertains to steering a playlisting service toward media items that are desirable to a listener.

BACKGROUND

Playback of media items are highly context dependent. Media items that fit well together typically share a common context, and media items are selected for playback based on this context. For example, playlists contain media items collected because the media items go well together in a context such as running, workout, dance, party, wedding, chill out, media items for me, etc. Each context defines a criterion for a media item's inclusion in the playlist. A radio station likewise might rely on contexts based on genre (rock, pop, country, etc.), themes (holiday music, recently released music, etc.), format (movie, sitcoms, etc.).

Many automatic media item playback services are known, but all are limited by an algorithm's input data regarding context. However, as users have more access to media items than ever before through streaming technologies and subscription services, users increasingly struggle to define a context for the media items that they would like played. This may be because users have taste in media items that are less confined to genres than in past generations, or may be due to being overwhelmed by options. Regardless, there is a need for a media item playback service that can generate a playlist or station of media items without a user supplied context.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 3A, 3B, and 3C illustrates an example illustration of the results of steering selection of media items in accordance with aspects of the present technology;

DESCRIPTION

Figure 1:
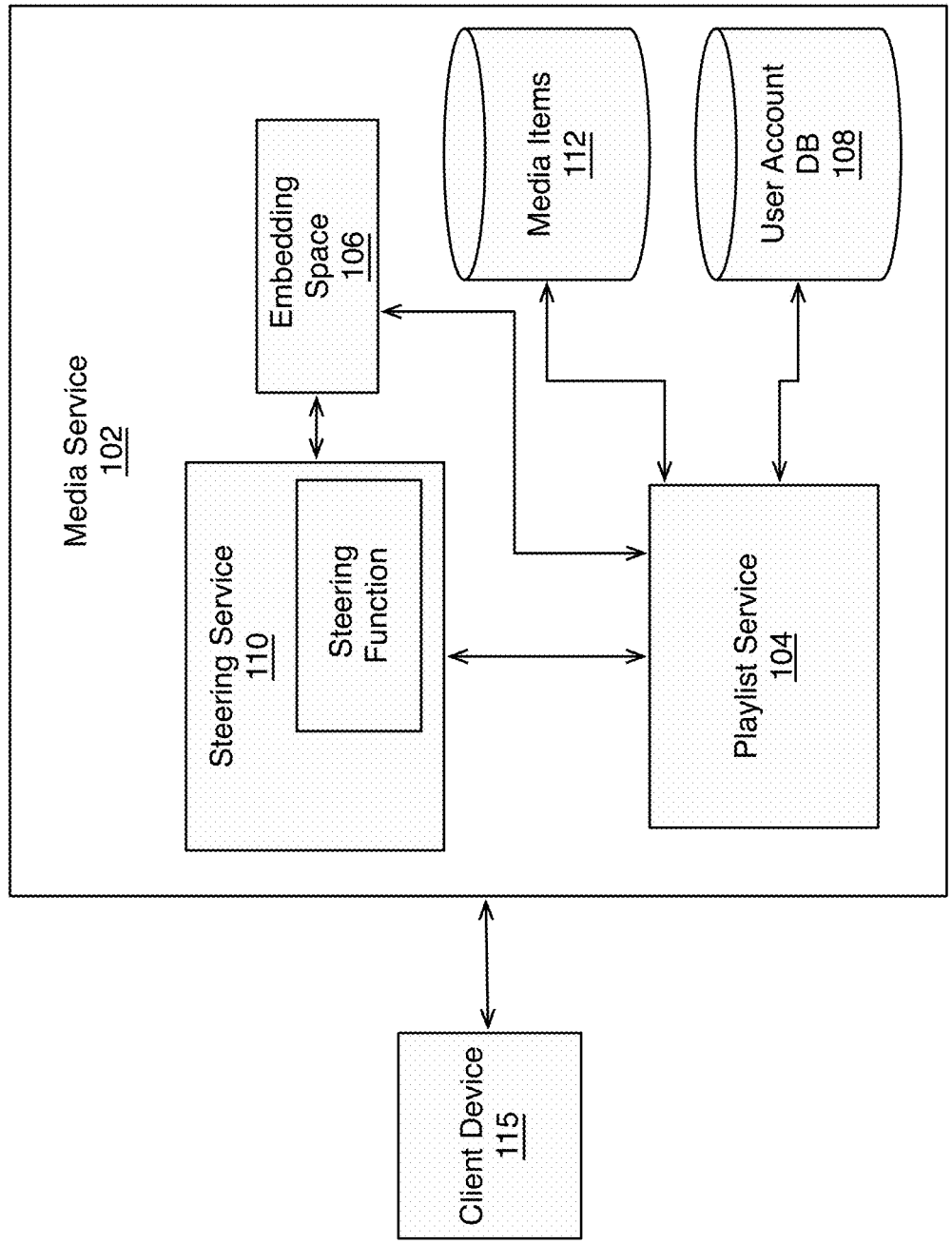
FIG. 1 illustrates an example system in accordance with aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a playlisting service to generate a playlist of media items in response to a request to play media items where the request may be devoid of any contextual cues to guide a playlisting service in selecting media items for playback. The present technology can quickly steer the playlisting service toward media items of interest to the requesting user while receiving minimal direction from the user.

For example, in a possible use case, a user may interact with a virtual assistant to request that a media item be played. For example the request may be, "virtual assistant play something." Such a request only includes a declaration that a media item is desired to be played back but does not include any hint of a particular media item or even a context from which media item candidates can be chosen. In response, the present technology can select one or more candidates for playback and begin automatically playing back one of the candidates. Assuming that the candidate chosen for playback is not suitable to the user at that time, the user may provide a steering request to "play something else" and, in response to this feedback, the present technology can steer the playlisting service to select a more suitable media item for playback to the user. Such steering comprises an intelligent selection of the next media item candidate through use of a machine learned function that takes into account previously played or skipped media items occurring prior to the steering request to predict a media item that will be considered suitable for playback by the requesting user.

In some embodiments, the steering request can be in the form of spoken language to a virtual assistant. For example the steering request may be, "virtual assistant play something else." The steering request only includes a declaration that a media item is desired to be played back but does not include any hint of a particular media item or even a context from which media item candidates can be chosen other than what was previously played is not what the user desires.

A steering request may not be the same as an instruction to skip a media item. A skip of a media item could come from a user that otherwise likes the media items being played, but chooses to skip a particular media item.

At the most basic level, a steering request represents an input that declares an interest in changing the criteria by which playlist service 104 has been selecting media items. A steering request reflects that the user desires to provide feedback that is greater than merely skipping a media item and allowing playlist service 104 to select a new candidate using the same criteria it used to choose at least the last candidate.

As indicated above a steering request can include an explicit spoken steering request. In some embodiments, a steering request can also be received when a user explicitly selects a selectable input, such as a "plays something else" button. In some embodiments, a steering request can be implied. As noted above, a steering request is not the same as a skip of a media item, but a skip of multiple media items in a row (e.g., skips of three or more media items in a contiguous sequence) can, in some embodiments, be considered an implied steering request.

FIG. 1 illustrates an example system embodiment of the present technology. FIG. 1 illustrates an example media service 102. Media service 102 includes playlist service 104. Playlist service 104 can include a playlisting algorithm that can select media item candidates based on criteria such as similarity to previously played media items, compatibility with a user profile, genre of the media item, the context to which the media item is associated, editor selections, etc. Media service 102 can be implemented using one or more computers that are communicatively coupled using a local or remote network.

Media service 102 can also include user account database 108, which can store information pertinent to user profiles of media service 102. The user profiles stored in user account database 108 can include data such as preferred genres, a log of previously played media items, favorite media items, downloaded media items, media items popular amongst the user's social connections, favorite artists, etc. for each respective user profile stored in user account database 108.

Media service 102 can also include one or more embedding space 106. Embedding space 106 is a dimensional construct in which representations of media items can be arranged so that media items having similar representations are arranged nearer to each other than media items having dissimilar representations. The representations define a media item according to one or more characteristics of the media item. For example, in some embodiments, the representations can be based on physical characteristics of the media items, such as timbre, tempo, and/or other audio characteristics for a music media item. In some embodiments the representations can be based on a population of users' behavior towards a respective media item—for example characteristics reflecting how often a population of users includes a respective media item in a grouping with one or more other media items. While physical characteristics and behavioral characteristics are given as examples herein, representations can be based on any desirable characteristics or combinations of characteristics for describing the media items.

The representations are used to place the media items in embedding space 106 in such a way that a media items having similar representations are located relatively proximate to each other in embedding space 106.

Media service 102 can also include at least one media item storage 112 for media items. Media item storage 112 can include copies of respective media items and associated metadata, which can be transmitted by media service 102 to one or more client devices 115. Media items include all types of media that is capable of playback including but not limited to music, video, audio-video, movies, advertisements, podcasts, audiobooks, etc.

Client device 115 can be a device associated with a specific user account having a user profile for which information is stored in user account database 108. While FIG. 1 illustrates only one client device 115, it will be appreciated that there can be many client devices. In some cases, a single user account may be associated with multiple client devices 115. In some embodiments, two or more user accounts may use the same client device 115, but in most instances, only a single user account can be logged into a client device 115 at any time. Client device 115 can be implemented as any computing device, including any or a combination of: a smart phone with an interactive touch screen, tablet computer, laptop computer, desktop computer, or a smart speaker device with the capability to interact with users via voice commands and responses, facial expressions, or gestures.

Media service 102 also includes steering service 110. Steering service 110 can be used to steer playlist service 104 toward media item candidates that will be suitable to the user for playback. When an initial request is received to "play something" by media service 102, playlist service 104 will cause a media item to be played on client device 115 but because little guidance was provided by the user in their request to "play something," it is possible that playlist service 104 will select a media item that is not desired by the user. The undesirable media item may be the first media item delivered by playlist service 104 or may be a subsequent media item. Steering service 110 functions to guide playlist service 104 to identify a media item candidate(s) that is desirable to the requesting user as quickly as possible. To do this, steering service 110 relies on a steering function, which can receive data identifying recently played media items, and recently skipped media items and, from this data, the steering function can guide playlist service 104 to select one or more media items that are likely to be desirable to the requesting user for playback by client device 115.

Figure 2:
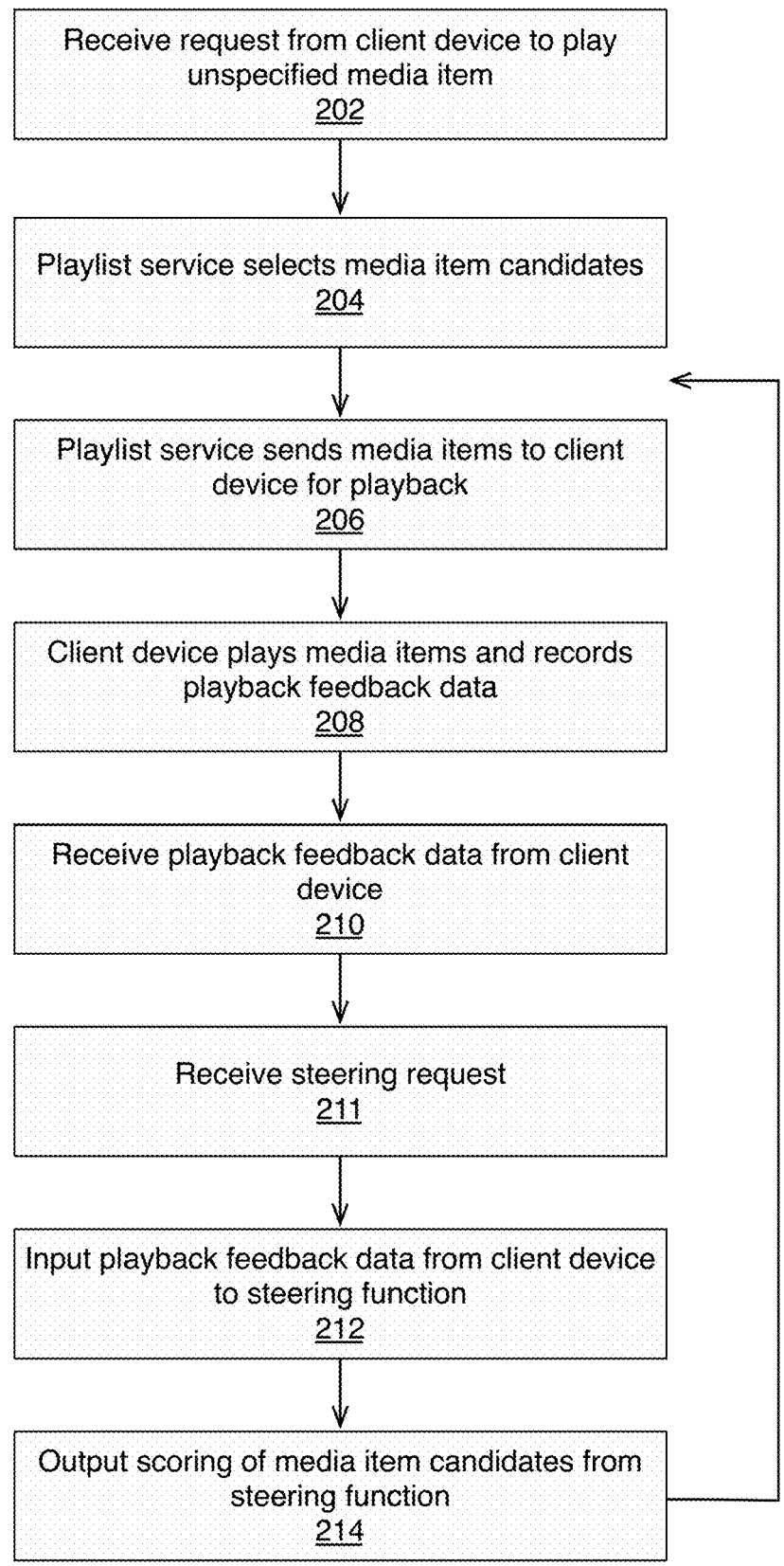
FIG. 2 illustrates an example method embodiment for steering selection of media items in accordance with aspects of the present technology.

FIG. 2 illustrates an example method embodiment in accordance with the present technology. While FIG. 2 will be discussed in the context of FIG. 1 this is for clarity of explanation purposes only and the method described in FIG. 2 should not be considered limited by the system illustrated in FIG. 1.

The method illustrated in FIG. 2 begins when media service 102 receives a request (202) from client device 115 to play an unspecified media item. The request may not provide any context from which to guide selection of a media item for playback. In some embodiments, request (202) can be in the form of a spoken request to a virtual assistant operating on client device 115, e.g. spoken request "play something." In some embodiments, request (202) can be in the form of a selection of a hardware or software button on client device 115, e.g. a selection of a "play" button without first selecting a media item, genre or other context from which to understand what media item is to be played.

In some embodiments, the only context provided with request (202) is by association with the application that received the request. For example, if the request was received within an audio playback application, there is at least a context that the request to play something refers to an audio media item(s). In some embodiments, request (202) can be received by a multi-purpose interface, such as a voice activated virtual assistant, and therefore request (202) is not accompanied by even a context that suggests the type of media being requested. In such embodiments, a media type can be randomly selected, or a default media type can be used.

In response to receiving request (202), playlist service 104 can select (204) media item candidates for playback. In some embodiments, playlist service 104 can select candidates based on information stored as part of the requesting user's profile stored in user account database 108. For example, requesting a user's profile can indicate the user's favorite genres, favorite artists, previously played media items or playlists, etc. In some embodiments, the user's profile can also include temporal and/or location data associated with past media item playback, and in such embodiments playlist service 104 can select media items previously played at a similar time and/or place. For example, playlist service 104 can receive request (202) at 8 AM on a weekday morning, and can determine that at the same time on a previous morning, the requesting user listened to a rock playlist. Based on this information, playlist service can select media items from the rock genre.

While playlist service 104 can determine media item candidates to be played based on data stored in user account database 108, any determined media item candidates represent no more than an educated guess of what the requesting user desires to have played since the request (202) did not provide any context to guide the selection of media items for playback.

After playlist service 104 has selected (204) media item candidates for playback, playlist service 104 sends (206) the media item candidates to client device 115. Client device 115 can then playback (208) one or more of the media item candidates. In some embodiments, client device 115 receives an order in which to play the media item candidates from playlist service 104. In some embodiments, client device 115 receives only media item candidates, and software on a client device can select which media item candidates to playback and in which order. In such embodiments wherein software of client device 115 selects media items from a list of media item candidates, the software can randomly select media items from the candidates to play subject to constraints that prevent selection of certain media items (e.g., a constraint could prevent three media items from the same album from being played in a sequence), or the software can rank candidates according to a criteria such as a similarity criterion wherein media items that are the most similar to several previously played media items are given higher rankings then less similar media items.

In some embodiments the initial media item candidates represents a prediction for what the requesting user desires to have played. To base future predictions off the initial media item candidates, the client device records (208) and sends feedback data including completed playbacks and skipped media items. In some embodiments the feedback data includes the sequence in which the media items were played to playlist service 104. Playlist service 104 can receive and record the feedback data (210).

In some embodiments, the feedback data can include completed playbacks, an input to skip playback of a media item. For example, if client device 115 completes playback of a first media item candidate, and then receives an instruction to skip playback of a second media item, playlist service 104 can record the completed playback of the first media item candidate and that the second media item candidate was skipped. In some embodiments, playlist service 104 can also receive other types of feedback data, such as declared feedback in the form of user ratings or likes of played media items. In some embodiments, feedback data can include implied feedback in the form of observations of increased volume, client device 115 orientations (which may indicate a user is looking at the screen of client device 115), etc.

The received (210) feedback data from client device 115 can be provided to steering service 110. The feedback data can include at least a media item identifier and an indication of whether the media item was played or was skipped. A media item is considered to be played when it was played without receiving a skip command. A media item is considered skipped when client device 115 receives a skip command during playback of the media item.

In some embodiments, wherein the playlist service 104 sent (206) the media item candidates with an order in which the candidates should be played, media service 102 can store the sequence. In some embodiments, such as when the client device is free to choose the order of the media item candidates, the feedback data from the client device can also include sequence data indicating the order in which the media items were played (or attempted to be played in the case of a skipped media item). Sequence data can include a time stamp, or position identifiers to indicate the sequence that the media items were played.

At some point a user may decide they want to have "something else" presented to him/her and the user can issue, and media service 102 can receive (211), a steering request. Perhaps the user isn't in the mood for the media items being played, or perhaps the user just wants to listen to something different. The user might not even know the reason for why the user wants to listen to something else, and the user might not know what they want to have played.

At the most basic level, a steering request represents an input that declares an interest in changing the criteria by which playlist service 104 has been selecting media items. A steering request reflects that the user desires to provide feedback that is greater than merely skipping a media item and allowing playlist service 104 to select a new candidate using the same criteria it used to choose at least the last candidate.

In some embodiments, the steering request can be in the form of a spoken language to a virtual assistant. For example the steering request may be, "virtual assistant play something else." The steering request only includes a declaration that a media item is desired to be played back but does not include any hint of a particular media item or even a context from which media item candidates can be chosen other than what was previously played is not what the user desires.

As indicated above a steering request can include an explicit spoken steering request. In some embodiments, a steering request can also be received when a user explicitly selects a selectable input, such as a "play something else" button. In some embodiments, a steering request can be implied. As noted above, a steering request is not the same as a skip of a media item, but a skip of multiple media items in a row (e.g., skips of three or more media items in a contiguous sequence) can be considered an implied steering request and can be used to generate a steering request by client device 115.

In some embodiments, feedback data is provided to steering service 110 after media service 102 has received (211) the steering request. The feedback data can include media item identifiers, whether each media item was skipped or played, and sequence data.

In some embodiments, steering service 110 can retrieve representations of the identified media items from embedding space 106. The representations define a media item according to one or more characteristics of the media item. For example, in some embodiments, the representations can be based on physical characteristics of the media items, such as timbre, tempo, and/or other audio characteristics for a music media item. In some embodiments, the representations can be based on a population of users' behavior towards a respective media item—for example characteristics reflecting how often a population of users includes a respective media item in a grouping with one or more other media items. While physical characteristics and behavioral characteristics are given as examples herein, representations can be based on any desirable characteristics or combinations of characteristics for describing the media items.

In some embodiments, steering service can receive data from the requesting user's profile from user account database 108. For example steering service 110 can receive data identifying the requesting user's most played genres and/or other relevant information.

Steering service 110 can input (212) received playback data from the client device and any other retrieved data (including, for example, media item representations from embedding space 106, preference data from user account database 108, etc.) into the steering function. Based on input (212) data steering function can output (214) a scoring of media item candidates that are likely to receive positive feedback. In some embodiments, steering service 110 can score media item candidates received from playlist service 104 based on how likely the media item candidates are to receive positive feedback from the user to which the candidates are presented. In some embodiments, steering service 110 can score media item candidates received from playlist service 104 based on how likely the media item candidates are to be skipped when they are presented to the user.

Steering service 110 can score media item candidates that have representations that are most similar to media items that have received positive feedback with positive scores, and media items most similar to media items that have received negative feedback with negative scores. In some embodiments, media items most recently played/skipped in the feedback data can have more influence than less recently played media item. For example, steering service 110 can receive media item candidates from playlist service 104. Steering service 110 can calculate an initial score indicating the relative similarity of each candidate to each media item in the feedback data, and multiply the score by a weighting factor for the media item in the feedback data. More recent media items in the feedback data receive a weighting factor closer to "1" and less recent media items in the feedback data receive a weighting factor closer to "0". Media items in the feedback data that received negative feedback data receive a negative weighting factor (for example, the most recently skipped media item might receive a weighting factor of "4", while a media item in the feedback data that was played 15 media items ago in the sequence might receive a weighting factor of "0.5"). The initial scores for each candidate relative to each media item in the feedback data can be multiplied by the respective weight given to the media item in the feedback data to yield a weighted score for the candidate relative to each media item in the feedback data. The weighted scores for the candidate relative to all the media items in the feedback data can be summed to yield an output score for the candidate.

In some embodiments, the output scoring (214) of media item candidates are received by playlist service 104, and the method begins again at step 204 where playlist service 104 utilizes the scoring of the media item candidates output by the steering function to select the highest scored candidates and/or to retrieve additional media item candidates.

In some embodiments, the steering function may suggest media item candidates itself. For example, the steering function could output either a media item identifier which identifies the media item in media item database 112, or can output a media item representation which can identify a location in embedding space 106, and playlist service 104 can either use these media items as candidates or can use these media items to select candidates that are similar to the media items output from steering service 110.

In some embodiments, steering service 110 is only utilized when playlist service 104 receives (211) a steering request from client device 115. The steering request indicates that the user of client device 115 was not satisfied with the selection of the media item playback, and as such steering service 110 is utilized to learn from the received feedback data to determine media item candidates that will be more satisfactory to the user of client device 115. In some embodiments, feedback data can be immediately provided to steering service 110 after receiving (211) the steering request. In such embodiments, after the steering request is received, the client device 115 will stop playing the current media item, discard any future items in the current playlist, request a new playlist from playlist service 104, and start playing the first item in that new playlist.

In some embodiments, any action on a steering request can be delayed to gain additional feedback data. In such embodiments, client device 115 can receive a steering request and skip to another media item. Client device 115 can continue to record feedback data, and request a new playlist at some later time by sending the recorded feedback data to media service 102 with a steering request.

Conceptually, the method illustrated in FIG. 2 works to continuously guide playlist service 104 to find suitable media items to be played by client device 115. At first, steering requests may be more frequent since the only guidance into the playlist service 104 is the unspecified input to play something else. Over iterations of steps 204, 206, 208, 210, 211, 212, 214, the feedback data should quickly become more positive as steering service 110 receives feedback and improves the inputs going into steering service 110.

In some embodiments, a factor in the media item candidates selected by playlist service 104 is previously played media items. Therefore, as steering function scores media items and influences the selection of upcoming media items by playlist service 104, the influence of steering service 110 can be maintained beyond just the media items that it has scored and provided to playlist service 104. Playlist service 104 can select future media items based in part on previously played media items. Since, after playing media items scored by steering service 110, effect of the steering service can better effectuate the user's desire to change the criteria by which playlist service 104 had been selecting media items.

The method illustrated in FIG. 2 can be further understood through the following use case. Assume that a user associated with a user profile is interested in several genres of music, for example rock, classic rock, electronic dance, and pop. This user can request that a virtual assistant play unspecified media items. Since playlist service 104 does not have any context by which to narrow its selection (204) of media item candidates, playlist service 104 can select (204) media item candidates based on their suitability, in general, for the user profile. Specifically, in this example, playlist service sends (206) client device 115 candidates to play, which client device 115 attempts to play (208) in a sequence in the following order: pop, electronic dance, pop, rock, classic rock as illustrated in FIG. 3A. In this example, client device 115 completes playback of the first three songs (pop, electronic dance, pop), but the rock song is skipped, and the user provides a steering request (211) ("virtual assistant, play something else"). The feedback (210) that the first three songs were played to completion but the rock song was skipped can be provided (212) to steering service 110 which can receive further information about the songs for which it has received feedback data and can input this information into the steering function along with representations of the media items from embedding space 106.

The output (214) of the steering function may be a further collection of media item candidates that consist of pop and electronic dance songs, but not rock songs. As client device 115 continues to playback (208) media item candidates, the upbeat pop songs are played, but the other pop songs are skipped, and all electronic dance songs are played to their completion as illustrated in FIG. 3B.

This feedback data illustrated in FIG. 3B can be input (212) to the steering service 110 after receiving another steering request (211) along with representations of the media items from embedding space 106, which can provide additional media item candidates. From the representations of the media items from embedding space, the steering function begins to determine that pop songs are only played if they are upbeat. As such, steering service 110 can output media item candidates that are predominantly electronic dance songs and some upbeat pop songs as illustrated in FIG. 3C.

Playlist service 104 can continue to monitor feedback data (21.0) from client device 115 and through each iteration of receiving a steering request (211), providing (212) data to steering service 110, and receiving (214) further media item candidates, client device 115 plays (208) more media items to completion and receives (208, 210) fewer feedback of "skipped." In fact, as illustrated in FIG. 3C, all the media items have been played without receiving a skip. Thus, while playlist service 104 originally provided media items that were not closely aligned with the type of music the user operating client device 115 wanted to listen to, playlist service 104, in combination with steering service 110, was able to quickly tailor media item candidates to the type of music the user wanted to listen to. Importantly, the user did not need to articulate exactly the type of music they were interested in listening to. Rather, they only needed to provide minimal feedback in the form of skipping media items they did not desire to listen to and issuing steering requests. Further, the resulting sequence of media items may even be better than if the user had provided a context, because it might have been hard to precisely define the context to match exactly what the user wanted to hear. For example, it may have been difficult for the user to request, and for playlist service 104 to parse, a request for primarily electronic dance songs where some upbeat popular songs are tolerated. Of course, in practice the actual defined context could even be much more complex.

Figure 4:
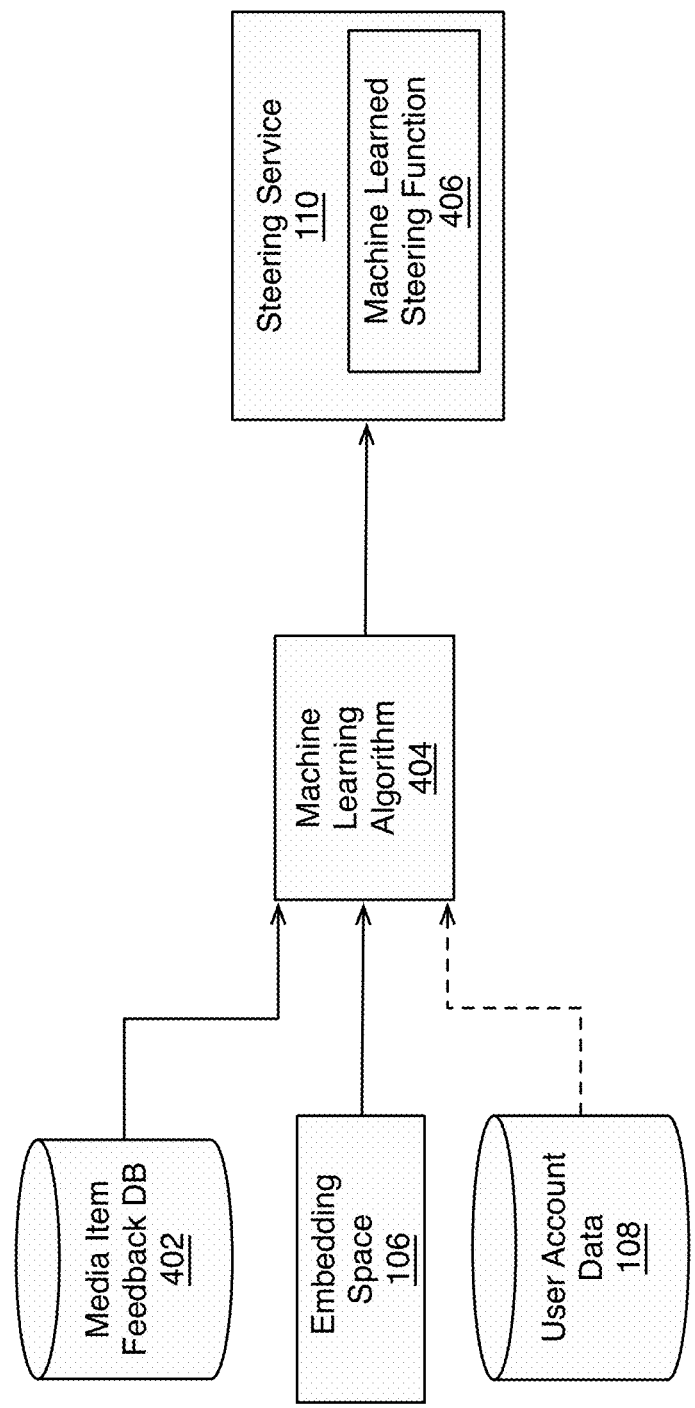
FIG. 4 illustrates an example system for training a machine learned steering function in accordance with aspects of the present technology.
Figure 5:
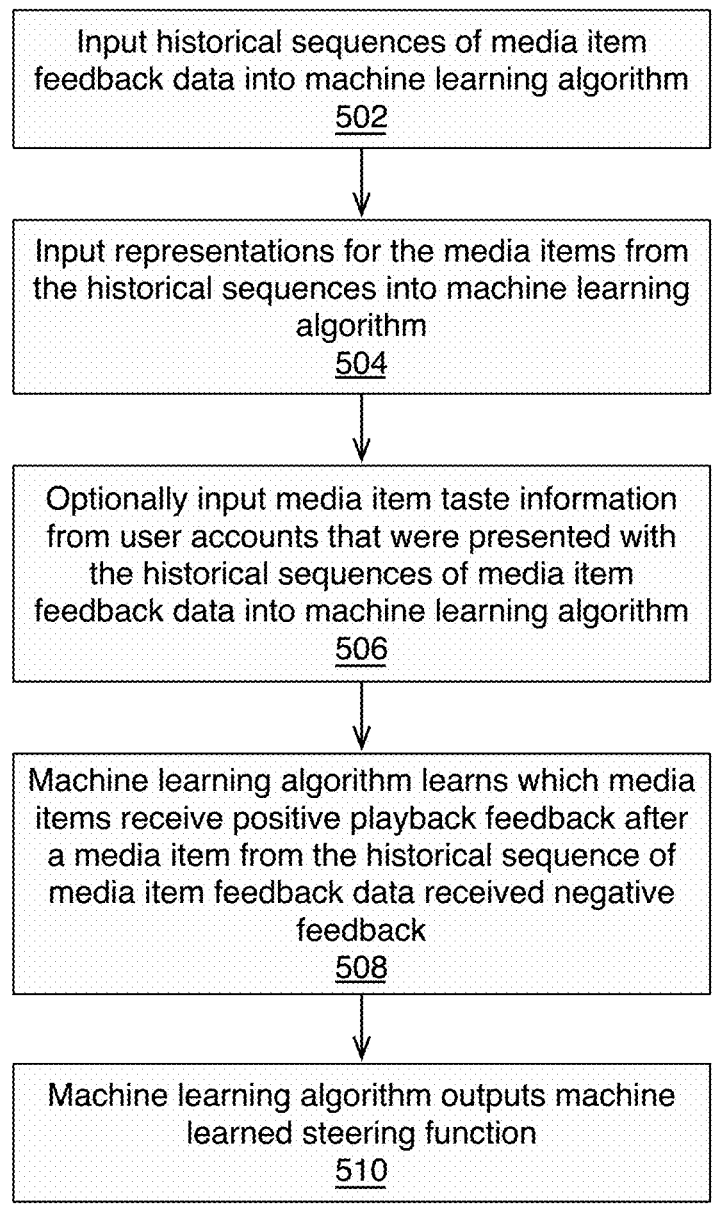
FIG. 5 illustrates an example method for training a machine learned steering function in accordance with aspects of the present technology.

In some embodiments, the steering function is a machine learned steering function. FIG. 4 illustrates an example system for training a machine learning algorithm, and FIG. 5 illustrates an example method used for training the machine learning algorithm. While FIG. 5 is discussed within the context of FIG. 4, this is for illustrative purposes only and the method described in FIG. 5 should not be considered limited by the system illustrated in FIG. 4.

As illustrated in FIG. 4, the example system includes media item feedback database 402. Media item feedback database 402 includes identification of media items along with the sequence that the media items are presented to a user and feedback data consisting of at least media items for playback that were completed and media items which were skipped.

In some embodiments, media item feedback database 402 includes data for sequences of media items presented to users of media service 102.

Figure 6:
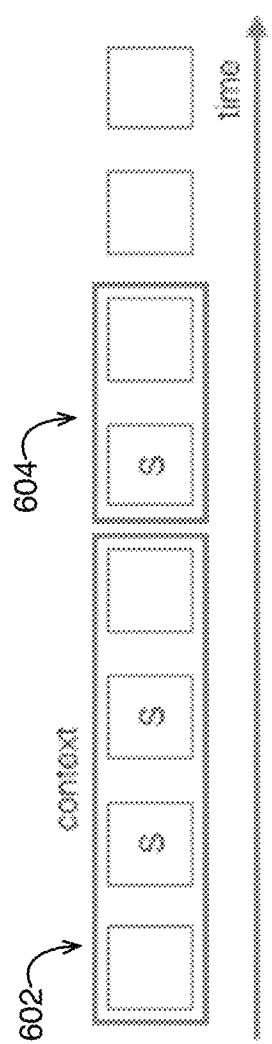
FIG. 6 illustrates an example historical sequence of media items in a media item database in accordance with aspects of the present technology.

In some embodiments, the media item feedback database 402 includes observed sequences of media items where a sequence terminates in a termination pair of media items consisting of a skipped media item followed by a played media item. The sequence can, for example, include up to thirty media items for context preceding the termination pair, and can include media items that were skipped and media items for which playback was completed. An example representation of a sequence is illustrated FIG. 6. As illustrated in FIG. 6, termination pair 604 of media items consisting of a skipped media item followed by a played media item is preceded by a sequence of context media items 602.

The example system also includes a machine learning function 404. Machine learning function 404 can be any suitable machine learning function including at least neural networks, deep learning functions, classifiers, or combinations thereof. In some embodiments, the function is an item-based relevance feedback model.

Figure 7A:
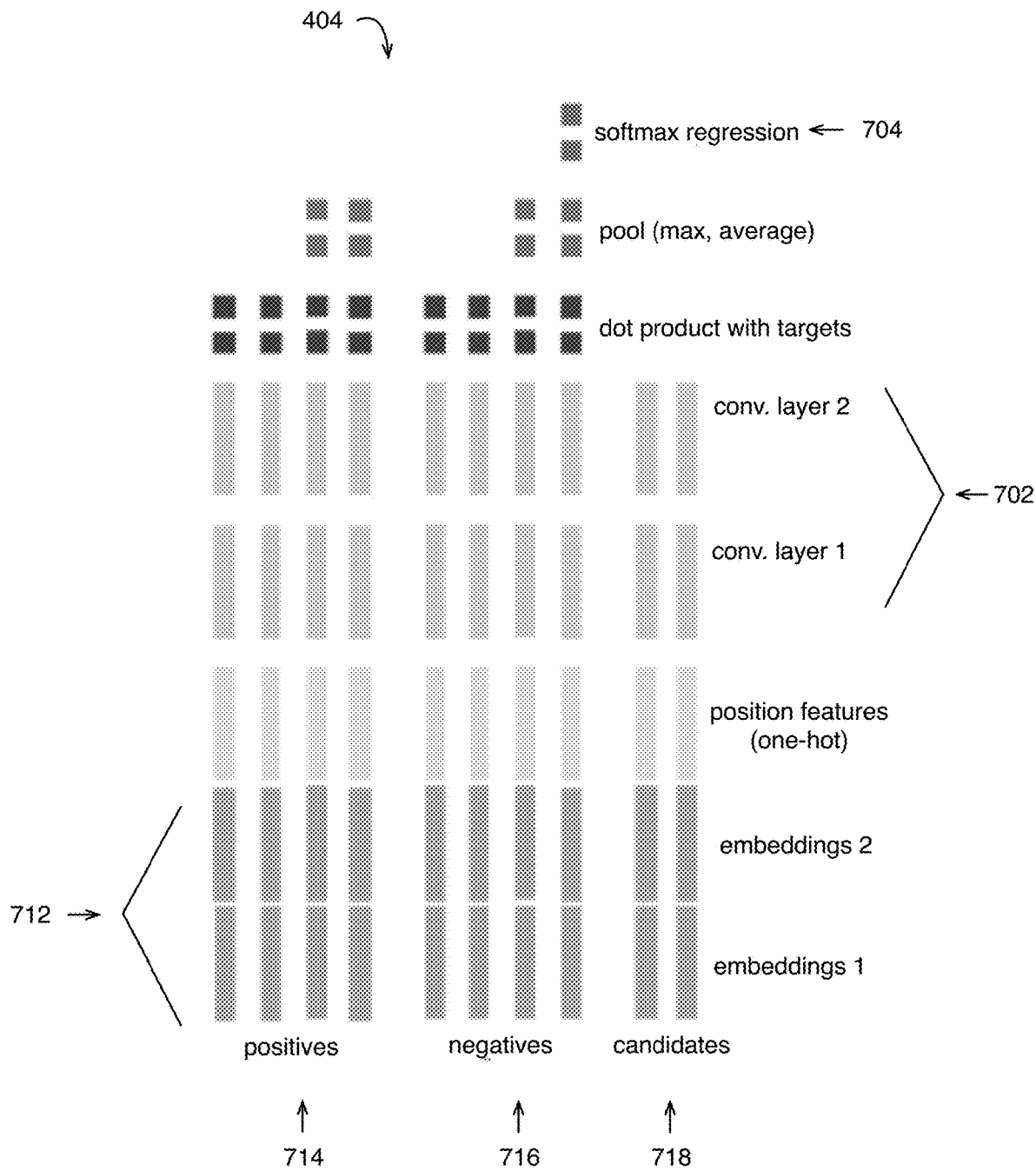
FIG. 7A illustrates an example machine learning algorithm in accordance with aspects of the present technology.

FIG. 7A schematically illustrates an example function 404 for predicting media items that will likely receive positive feedback following a sequence of media items. FIG. 7A illustrates example machine learning function 404 including a convolutional neural network 702 with a machine learning classifier function 704. As described in more detail below, function 404 can receive as inputs an identification or representation of media items played in a sequence 712, whether the respective media item was played 714 (positive feedback) or skipped 716 (negative feedback), and candidate media items 718 to be scored based on how likely the media item is to receive positive feedback if it were presented to the user following the previously played sequence. This raw data can be passed through one or more convolutional layers 702 before being used to compute a similarity to the respective candidates. The resulting values can then be fed into classifier 704 to predict a score for each respective candidate 718.

Machine learning function 404 can be given training tasks to learn how to score or classify which media items are likely to be played if presented to a user immediately after a sequence of media items. In some embodiments, the sequence of media items includes at least one media item that was skipped.

FIG. 5 illustrates an example method used for training the machine learning algorithm. Machine learning function 404 can receive (action 502 of FIG. 5) historical sequences of media item feedback data from media item feedback database 402 (such as the sequence represented in FIG. 6) including media item identifiers of media items in the sequence, a sequence in which media items were played, whether those media items were skipped or playback was completed. The data in media item feedback database 402 serves as a structured learning data set since it includes media items observed receiving feedback.

For example, machine learning function 404 is given a task of learning which media items in the termination pair 604 of media items should receive positive feedback (completed playback) after the sequence of context media items 602 and/or learning which media item in the termination pair 604 of media items is likely to be skipped when presented to user. This can be accomplished by presenting the media items in the termination pair 604 as candidates to function 404 and the context media items 602 as the media items played in a sequence 712. The classification layer 704 is trained by attempting to correctly classify the candidates in the termination pair 604 of media items as likely to be played or likely to be skipped. Since it has already been observed that one media item of termination pair 604 was skipped and one was played, the performance of function 404 can be judged by how often it correctly classifies each media item of the termination pair 604 compared to the observed data, and feedback regarding correct and incorrect classifications can be fed back into the classification layer 704. This process can be repeated for any number of observed sequences in media item feedback database 402 including context media items and a termination pair including a skipped media item and a played media item until acceptable performance of function 404 is achieved.

Machine learning function 404 can also receive (action 504 of FIG. 5) media item representations for the media items 712 in the historical sequences from embedding space 106. This data increases the amount of information about individual media items available to the machine learning function 404. As addressed above, media item representations describe characteristics of a media item. In some embodiments, the representations can be descriptive of the intrinsic attributes (such as musical attributes) of a media item. In some embodiments, the representations can be descriptive of behavioral attributes observed from a population of users as they interact with the media item (such as what other media items are considered similar to the media item, or what media items are likely to be played with the media item).

In some embodiments, multiple representations of the same media item can be provided to machine learning function 404. For example, as illustrated in FIG. 7A the media items played in a sequence 712 can be represented by embeddings from two different embedding spaces, i.e., each media item can be represented by two different representations. These embeddings can be combined into a single representation. As illustrated in FIG. 7A, the embeddings can be combined into a single one-hot representation, though any suitable combination technique can be used.

A benefit of using representations of media item is that the machine learning function 404 learns more than the identity of media items in the historical sequences and the identity of a good media item to suggest as a candidate that is likely to receive positive feedback. Instead, the machine learned function can learn what a representation might be for a media item that is likely to receive positive feedback. Such a representation can be more valuable than identifying a specific media item because a representation can be used to look up media items with a similar representation in embedding space 106. Using representations of media items also allows steering function 406 to evaluate media items it has been exposed to during training.

In some embodiments, machine learning function can also receive additional data from user account database 108. For example, machine learning function 404 can receive (action 506 of FIG. 5) taste information about favorite genres of a user that was presented with a specific sequence of media items from feedback database 402. This data can provide specific user's profile information to machine learning function 404 so that machine learning function 404 can also learn how characteristics in users' profiles can influence which media items will receive positive feedback after media item receiving negative feedback has been presented.

From the input data, machine learning algorithm 404 learns (action 508) which media items, or what media item representations are likely to receive positive or negative playback feedback after a historical sequence of media items was presented to the user by observing how often machine learning algorithm 404 correctly classified the candidates in the termination pair 604. When machine learning algorithm 404 successfully classifies candidates in the termination pair 604 as a candidate likely to be skipped or played at least 60% of the time, the machine learning algorithm can be considered sufficiently trained. In some embodiments, machine learning algorithm is not considered sufficiently trained until it correctly classifies candidates in the termination pair 604 at least 65% of the time, or at least 75% of the time. Even after machine learning algorithm 404 is considered sufficiently trained, it can continue to be improved through exposure to additional sequences of media items.

The output (action 510) of machine learning function 404 is machine learned steering function 406 which can be utilized, for example, as the steering function addressed in FIG. 1 and FIG. 2.

Figure 7B:
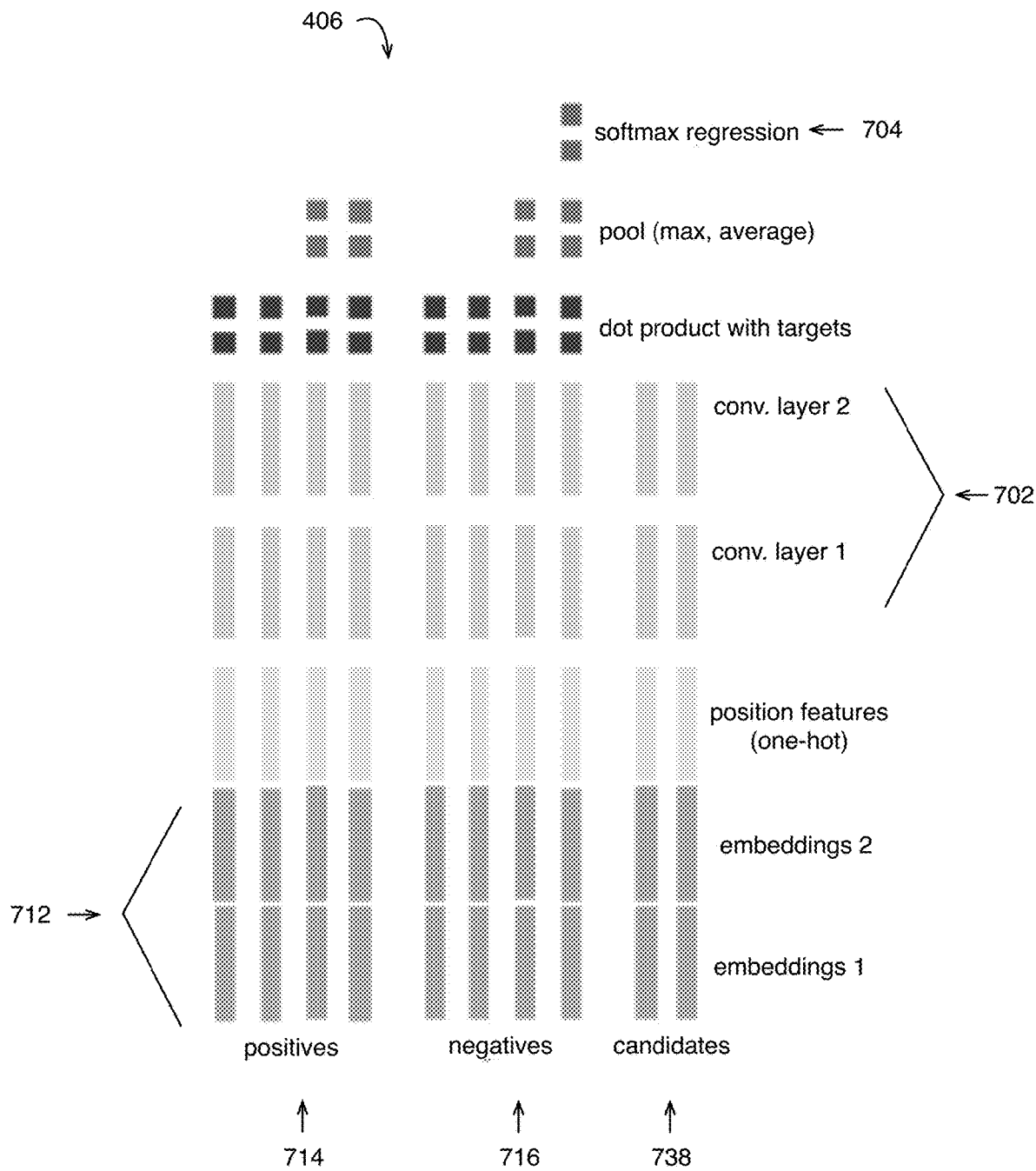
FIG. 7B illustrates an example machine learned steering function in accordance with aspects of the present technology.

FIG. 7B illustrates steering function 406 of steering service 110 that results from machine learning function 404 having been successfully trained. Steering function 406 will operate in the same manner as machine learning function 404 except that instead of predicting whether machine learning function 404 can accurately predict which media item from termination sequence 704 received positive feedback, steering function 406 predicts which candidates are likely to be played to completion or likely to be skipped.

Specifically, a sequence 712 of media items having playback feedback data can be input (212) into machine learned steering function 406 in the same manner as described with respect to machine learning function 404 in FIG. 7A. Additionally, media item candidates 738 provided by playlist service 104 can be input into scoring function 406. Scoring function 406 can process these media items as described with respect to machine learning function 404 in FIG. 7A, and classifier 704 can output (214) scores reflecting how likely it is that the respective candidates would be played to completion if they were presented to a user following the input (212) sequence 712 of media items.

In some embodiments, machine learning function 404 can continuously or intermittently receive additional historical sequences of media item feedback to continue to learn and optimize machine learned steering function 406. In some embodiments, the additional historical sequences of media item feedback can be sequences that include media items receiving negative feedback and then subsequent media items that were played as a result of candidates output by machine learned steering function 406. In this way, machine learning algorithm 404 can be included in a feedback loop where machine learning algorithm 404 can learn from past feedback data made on past recommendations and adjust machine learned steering function 406 accordingly.

While the embodiments addressed above pertain to steering requests wherein the user does not provide much contextual input regarding media items that the user desires to be played, in some embodiments, a user may also provide steering requests with some context. In such embodiments, a user can include a contextual cue with a steering request. For example, a user listening to jazz music can request that media service 102 "play something a little different." In such embodiments, the steering request is still includes an undefined component, but includes context that the jazz music that is currently being played is close to what the user desires. In another example, the user may provide a steering request to "play something a little faster." While the steering request is more defined, the meaning of a "a little" is too relative and imprecise for playlist service 104 or steering service 110 to know precisely what attributes the user is requesting, and therefore, this steering request can also be considered to include an undefined component.

In such embodiments wherein steering requests are accompanied by some context, machine learned steering function 406 can be trained on data sets where similar steering requests have been provided and user accounts have skipped or listened to output media items.

Figure 8:
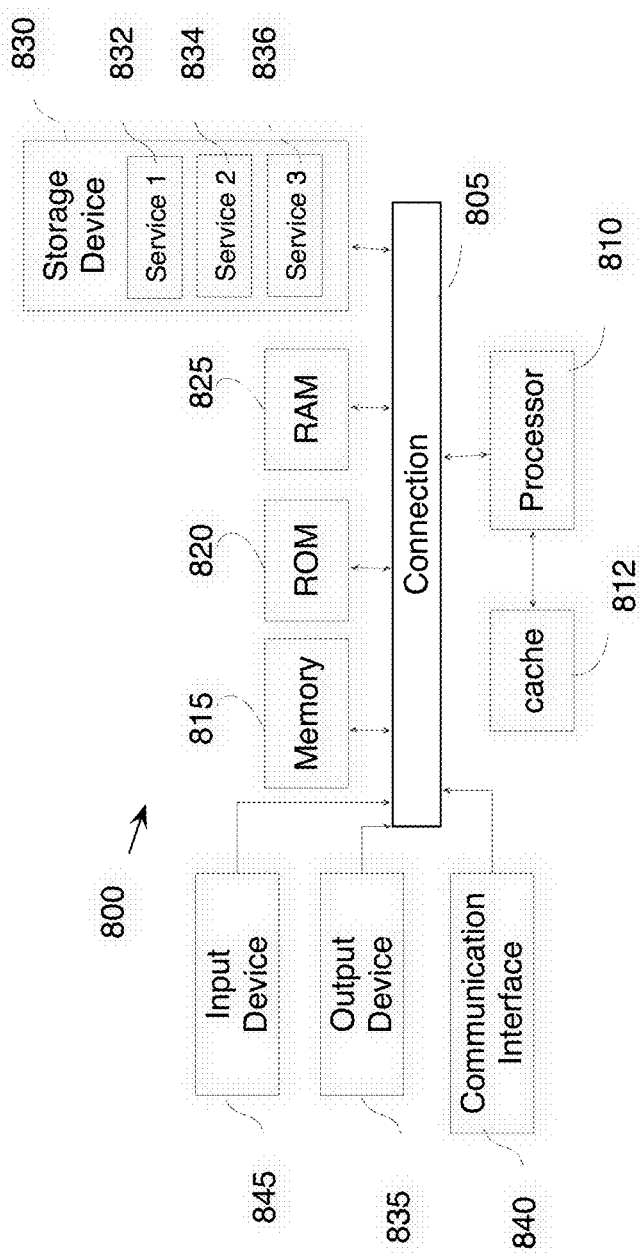
FIG. 8 illustrates an example computing system architecture in accordance with aspects of the present technology.

FIG. 8 shows an example of computing system 800, which can be for example any computing device making up media service 102, in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. At least one non-transitory computer readable medium comprising instructions stored on the computer readable medium that when executed cause a computing system to:
receive a request to play unspecified media items from a client device;
transmit a first collection of media items for playback to the client device;
receive, during playback of the first collection of media items, a steering request and feedback from the client device, the feedback including a sequence of playback of the first collection of media items and a feedback sequence for the first collection of media items, wherein the feedback sequence indicates a skipped status or a played status for each of a plurality of media items of the collection of media items in the sequence of playback, and
wherein the steering request indicates a request to modify a criteria by which media items are selected for playback; and
based on the steering request and the feedback sequence, determine a second media item as a candidate media item for playback by the client device, wherein the second media item was not included with the first collection of media items, and wherein the second media item is determined based on an ordering of the feedback sequence and is further based on a score of how likely the second media item will receive positive feedback after playback of the first collection of media items.

2. The at least one non-transitory computer readable medium of claim 1, wherein the determination of the second media item as the candidate media item for playback by the client device is based on representations and the feedback sequence and wherein the representations describe characteristics of the plurality of media items for which feedback was received.

3. The at least one non-transitory computer readable medium of claim 1, wherein the determination of the second media item is based on user profile information, the user profile information identifying one or more media item preferences of a user that provided the request to play unspecified media items.

4. The at least one non-transitory computer readable medium of claim 1, wherein the feedback includes positive feedback regarding playback of at least one media item from the first collection of media items in addition to negative feedback, and the sequence of playback of the first collection of media items.

5. The at least one non-transitory computer readable medium of claim 1, wherein the determination of the second media item is performed using a machine learned function.

6. The at least one non-transitory computer readable medium of claim 5, wherein the instructions are effective to cause the computing system to train a machine learning system to yield the machine learned function, the instructions cause the computing system to:
input feedback data for media items played in a historical sequence to the machine learning system, where some of the feedback data for the media items played in the historical sequence is negative feedback;
learn, using the machine learning system, which media items were played in the historical sequence after the negative feedback; and
output the machine learned function by the machine learning system.

7. A method comprising:
sending first media items for playback to a client device;
recording playback data for the first media items, the playback data includes a feedback sequence for the first media items, wherein the feedback sequence indicates a skipped status or a played status for each of a plurality of media items of the first media items; and
after receiving a steering request, identifying second media items as candidates for playback based on an analysis of the recorded playback data, wherein the steering request indicates a request to modify a criteria by which media items are selected for playback, and wherein the second media item is determined based on an ordering of the feedback sequence and is further based on a score of how likely the second media item will receive positive feedback after playback of the first collection of media items.

8. The method of claim 7 comprising:
receiving input feedback data for media items played in a historical sequence, where some of feedback data for the media items played in the historical sequence is negative feedback, and
learning which media items were played in the historical sequence after the negative feedback, and
outputting a machine learned function for use in the analysis of the recorded playback data to identify the second media items as the candidates.

9. The method of claim 8, wherein the input feedback data also includes user profile information for a user that provided the feedback data for the media items played in the historical sequence, the user profile information identifying one or more media item preferences of the user.

10. The method of claim 8 comprising:
inputting representations to the machine learned function, the representations describing characteristics of the first media items for which feedback data was received for the media items played in the historical sequence.

11. The method of claim 8, wherein the media items played in the historical sequence are located in an audio characteristics embedding space, the method comprising:
inputting the feedback data for media items played in the historical sequence into the machine learned function along with an audio characteristic representation from the audio characteristics embedding space, whereby the machine learned function can score the second media items as candidates for playback with audio characteristics that are likely to result in a completed playback.

12. The method of claim 8, wherein the media items played in the historical sequence are located in a behavioral characteristics embedding space, the method comprising:
inputting the feedback data for media items played in the historical sequence into the machine learned function along with a behavioral characteristic representation from the behavioral characteristics embedding space, whereby the machine learned function can score the second media items as candidates for playback with behavioral characteristics that are likely to result in a completed playback.

13. A system comprising:
at least one processor; and at least one storage comprising instructions stored on the storage that when executed cause the system to:
receive a request to play unspecified media items from a client device;
transmit a first collection of media items for playback to the client device;
receive, during playback of the first collection of media items, a steering request and feedback from the client device, the feedback including a sequence of playback of the first collection of media items and a feedback sequence for the first collection of media items, wherein the feedback sequence indicates a skipped status or a played status for each of a plurality of media items of the collection of media items in the sequence of playback, and
wherein the steering request indicates a request to modify a criteria by which media items are selected for playback; and
based on the steering request and the feedback sequence, determine a second media item as a candidate media item for playback by the client device, wherein the second media item was not included with the first collection of media items, and wherein the second media item is determined based on an ordering of the feedback sequence and is further based on a score of how likely the second media item will receive positive feedback after playback of the first collection of media items.

14. The system of claim 13, wherein the determination of the second media item as the candidate media item for playback by the client device is based on representations and the feedback sequence and wherein the representations describe characteristics of the plurality of media items for which feedback was received.

15. The system of claim 13, wherein the determination of the second media item is based on user profile information, the user profile information identifying one or more media item preferences of a user that provided the request to play unspecified media items.

16. The system of claim 13, wherein the feedback includes positive feedback regarding playback of at least one media item from the first collection of media items in addition to negative feedback, and the sequence of playback of the first collection of media items.

17. The system of claim 13, wherein the determination of the second media item is performed using a machine learned function to select the second media item.

18. The system of claim 17, wherein the instructions cause the system to:
train a machine learning system to yield the machine learned function, the instructions cause the system to:
input feedback data for media items played in a historical sequence to the machine learning system, where some of the feedback data for the media items played in the historical sequence is negative feedback;
learn, using the machine learning system, which media items were played in the historical sequence after the negative feedback; and
output the machine learned function by the machine learning system.

19. The system of claim 18, wherein the input feedback data also includes user profile information for a user that provided the feedback data for the media items played in the historical sequence, the user profile information identifying one or more media item preferences of the user.

20. The system of claim 18, wherein the instructions cause the system to:
input the feedback data for media items played in the historical sequence along with an audio characteristic representation from the audio characteristics embedding space, whereby the machine learned function can identify the second media items as candidates for playback with audio characteristics that are likely to result in a completed playback.

* * * * *